United States Patent
Diachina et al.

(10) Patent No.: US 8,665,805 B2
(45) Date of Patent: Mar. 4, 2014

(54) NEAR COMPANION MODE

(75) Inventors: John Diachina, Garner, NC (US); Paul Schliwa-Bertling, Ljungsbro (SE); Bogdan Sutkowski, Apex, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 733 days.

(21) Appl. No.: 12/540,118

(22) Filed: Aug. 12, 2009

(65) Prior Publication Data

US 2010/0040008 A1    Feb. 18, 2010

Related U.S. Application Data

(60) Provisional application No. 61/088,227, filed on Aug. 12, 2008.

(51) Int. Cl.
*H04W 4/00* (2009.01)

(52) U.S. Cl.
USPC .......................................................... 370/329

(58) Field of Classification Search
USPC ................................................. 370/360, 432
See application file for complete search history.

(56) References Cited

U.S. PATENT DOCUMENTS

| | | | | |
|---|---|---|---|---|
| 4,513,427 A | * | 4/1985 | Borriello et al. | 375/360 |
| 7,385,999 B1 | * | 6/2008 | Young et al. | 370/432 |
| 8,326,341 B2 | * | 12/2012 | Hugi et al. | 455/522 |
| 8,355,389 B2 | * | 1/2013 | Kasslin et al. | 370/338 |
| 2010/0034146 A1 | * | 2/2010 | Hou et al. | 370/328 |
| 2010/0081448 A1 | * | 4/2010 | Wong et al. | 455/452.1 |

OTHER PUBLICATIONS

3GPP TS 44.060 V8.1.0, May 2008, entire document.*
Ericcson "Remaining Details on Control Signalling for MU-MIMO Transmission Mode", 3GPP TSG-RAN WG1 #53, R1-082028, Kansas City, USA, May 5-9, 2008.*

* cited by examiner

*Primary Examiner* — Joseph Bednash

(57) ABSTRACT

Two User Equipment (UE) operate in a Near Companion Mode (NCM), in which a monitoring UE (MUE) monitors an uplink transmission opportunity granted to its companion UE (CUE) on a shared uplink channel. If the CUE does not begin transmitting within a predetermined portion of its transmission opportunity, the MUE may utilize the transmission opportunity to transmit an uplink data packet. In one embodiment, where the CUE does not have data to transmit, it may transmit a predetermined pattern at the beginning of its transmission opportunity, to indicate to the MUE that the transmission opportunity is available. The MUE may transmit an NCM radio block using the entire symbol space associated with the last three of four bursts allocated to the CUE, or using a newly defined NCM format comprising four abbreviated bursts, using only a portion of the symbol space associated with the four bursts corresponding to the transmission opportunity allocated to the CUE.

30 Claims, 4 Drawing Sheets

NEAR COMPANION MODE

This application claims priority to U.S. Provisional Patent Application Ser. No. 61/088,227, titled "Near Companion Mode," filed Aug. 12, 2008, assigned to the assignee of the present application, and incorporated herein by reference in its entirety.

FIELD OF THE INVENTION

The present invention relates generally to wireless communication networks, and in particular to a system and method of improving uplink bandwidth utilization by defining a near companion mode for User Equipment, and allowing one UE to utilize uplink bandwidth scheduled for a companion UE.

BACKGROUND

In many wireless communication network protocols, uplink communications—from mobile User Equipment (UE) to fixed network transceivers (e.g., NodeB)—are explicitly scheduled by network controllers. However, the UE may not always have uplink data packets ready to transmit. For example, a UE based user may be engaged in a voice call with a fixed network based user where the speech service is implemented by packet data transfers, such as Voice over Internet Protocol (VoIP). If the UE based user is listening to the other party (i.e., receiving data packets containing speech information on the downlink) and not speaking, the UE will typically not have any data packets to transmit to the network on the uplink since both users will not typically speak simultaneously. If a network controller has allocated the UE a transmission opportunity on a shared uplink channel—for example, a time slot on an uplink frequency allocated to one or more UEs by the network—the transmission opportunity will go unutilized if the UE has no data packets to transmit. If other mobile UEs served by the same network controller and having been allocated the same shared uplink channel, have data packets to transmit, the failure of a specific UE to utilize its allocated transmission opportunity reduces overall uplink bandwidth utilization and represents a waste of limited air interface resources.

SUMMARY

According to one or more embodiments described and claimed herein, two UEs operate in Near Companion Mode (NCM). In NCM, each UE monitors the uplink transmission opportunities of the other as they are granted by the network controller using downlink information such as a UE specific Uplink State Flag (USF) value assigned by the network to each companion UE. In particular, a monitoring UE (MUE) monitors uplink transmission opportunities allocated to its companion UE (CUE) by reading downlink information such as the USF assigned to its CUE sent by the network controller. If the USF assigned to the CUE is sent by the network then the MUE knows its CUE has been allocated an uplink transmission opportunity. If its CUE does not begin transmitting on the shared uplink channel corresponding to its allocated transmission opportunity within a predetermined amount of time, the MUE may utilize the remaining portion of that transmission opportunity by transmitting an uplink data packet. In one embodiment, where the CUE does not have data to transmit on the shared uplink channel for a given allocated transmission opportunity, it may transmit a predetermined pattern using a limited portion of the transmission opportunity (e.g., using the first of four bursts comprising a given transmission opportunity), to affirmatively indicate to the MUE that the uplink transmission opportunity is available. The MUE may then transmit an abbreviated instance of its next available data packet (e.g., three of four bursts normally used to transmit a data packet) using the last three bursts associated with the transmission opportunity granted to its CUE. Alternatively, if only a portion of the first burst associated with a transmission opportunity granted to its CUE is needed by the MUE to determine that its CUE is not using a given transmission opportunity, the MUE may transmit a data packet using four instances of a newly defined NCM burst format (i.e., four abbreviated bursts each sent using only a portion of each of the four burst periods associated with a normal transmission opportunity).

One embodiment relates to a method of transmitting uplink data packets in a wireless communication network by a first UE. The first UE enters near companion mode upon receiving from the network an identification of a second UE (e.g., a USF unique to the second UE) and an indication to consider the second UE a companion UE operating in near companion mode. The first UE monitors USFs sent by the network to detect uplink transmission opportunities allocated to its companion UE and determines that such a transmission opportunity has been granted on a shared uplink channel. The first UE then monitors the transmission of its companion UE and thereby determines that its companion UE does not transmit an uplink data packet on the shared uplink channel for which a transmission opportunity has been granted, and therefore the first UE transmits an uplink data packet using some remaining portion that transmission opportunity.

Another embodiment relates to a method of receiving uplink data packets in a wireless communication network by a controller associated with one or more fixed network transceivers. The controller determines that first and second UEs served by the controller are eligible for operation in near companion mode. The controller transmits to each of the first and second UEs, a near companion mode indicator indicating that near companion mode is to be used and the identity of the other UE (i.e., the USF unique to the UE to be considered as the near companion UE). The controller allocates a shared uplink channel (e.g., channel frequency and timeslot(s) to be used) common to each of the first and second UEs, and receives uplink data packets from the second UE within transmission opportunities allocated to the first UE on the shared uplink channel.

DETAILED DESCRIPTION

Figure 1:
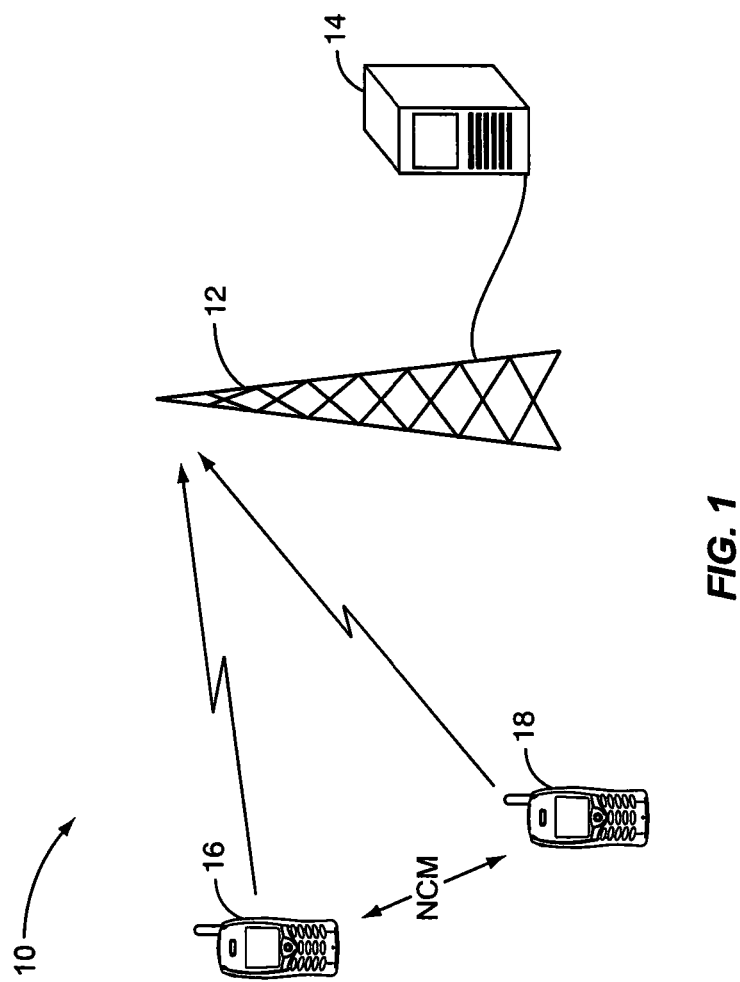
FIG. 1 is a functional diagram of a wireless communication network, depicting two similarly situated UEs served by a network controller.

FIG. 1 depicts a wireless communication network 10, including a representative fixed network transceiver 12 (e.g., a NodeB) and a controller 14. In various network protocols, the controller 14 may be dedicated to the transceiver 12, or may alternatively control a plurality of transceivers 12. In the latter case, each transceiver 12 may also include a controller or processor (not shown). Two mobile, wireless User Equipment (UE) 16, 18, are served by the controller 14, and transmit uplink communications (e.g., data packets) to the transceiver 12 which are subsequently delivered to the desired destination address (e.g., a user in the fixed network). According to embodiments described and claimed herein, the UEs 16, 18 may advantageously operate in Near Companion Mode (NCM), as indicated in FIG. 1.

Embodiments of the present invention are described herein with reference to a wireless communication network and operating according to the Global System for Mobile communications protocol (GSM), and concomitant General Packet Radio Service (GPRS) and its extensions, such as Enhanced Data Rates for GSM Evolution (EDGE). However, the present invention is not limited to this, or any other, specific network protocol, but rather may be advantageously applied to any wireless communication network 10 in which subscribers are allocated a specific shared uplink channel for transmission of uplink data packets using UE specific transmission opportunities indicated by the network as part of downlink signaling information read by all UE that have been allocated the same shared uplink channel. As used herein, a shared uplink channel refers to a combination of channel frequency and time slot(s) allocated to a set of one or more UEs where UE-specific USF values sent by the network determine which UE is granted a transmission opportunity on that shared channel.

Figure 2:
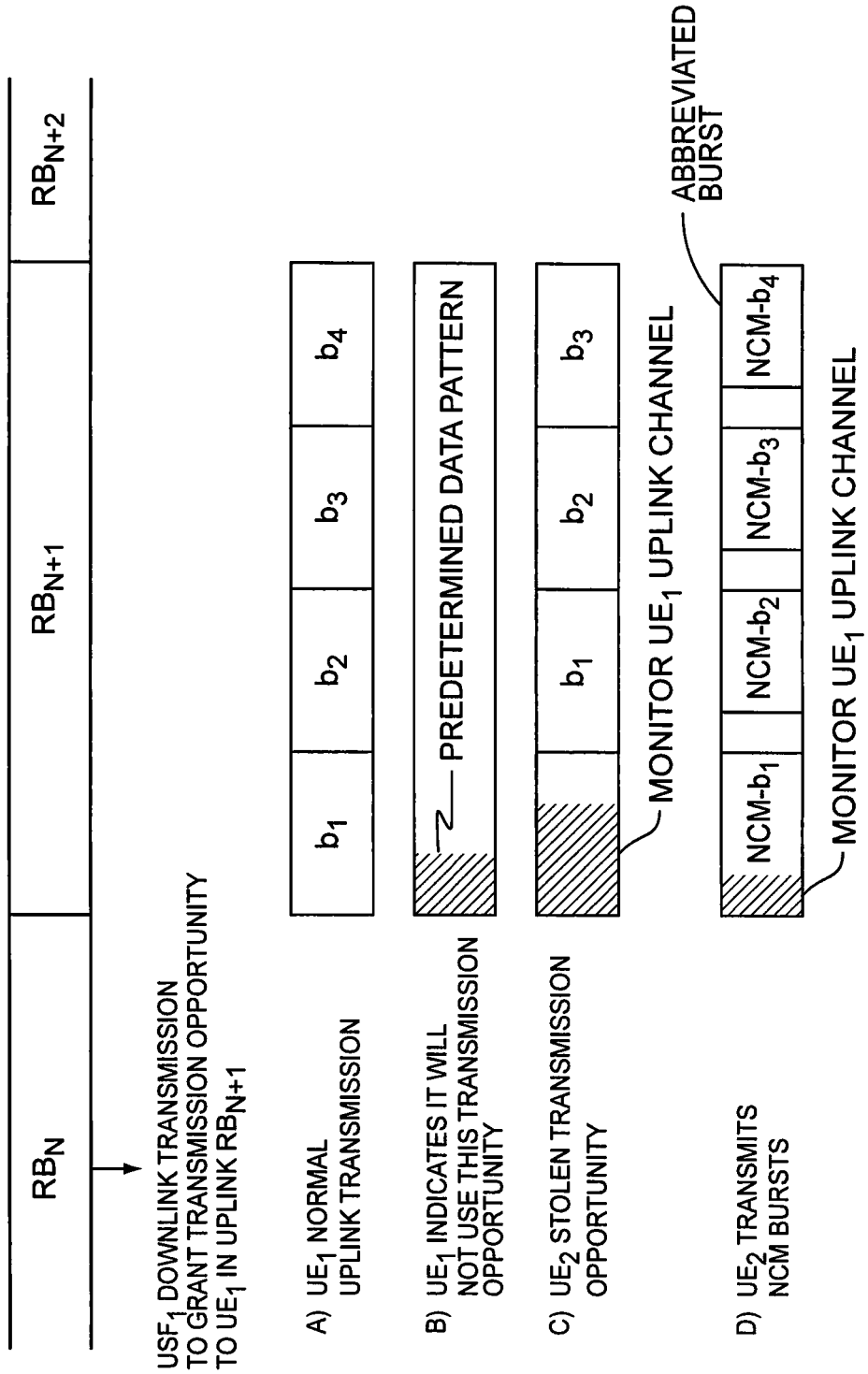
FIG. 2 is a diagram of an allocated uplink channel and possible uplink transmissions on that channel.

As one example of an uplink channel, FIG. 2 depicts a shared uplink channel allocated to a first UE 16 and a second UE 18 wherein a transmission opportunity comprising a Radio Block $RB_{N+1}$ in the uplink has been allocated to $UE_1$ by the controller 14. Note that FIG. 2 explicitly shows a series of downlink radio blocks $RB_N$, $RB_{N+1}$, and $RB_{N+2}$. The uplink radio blocks corresponding to these downlink radio blocks are slightly offset (to the right) but for the purpose of explanation herein can be considered as being aligned with the downlink radio blocks (e.g., uplink $RB_{N+1}$ can be considered as occurring directly below the downlink $RB_{N+1}$ shown in FIG. 2). Uplink Radio Block $RB_{N+1}$ comprises a predetermined duration (e.g., 4 instances of a given timeslot where each instance is also known as a burst) on a predetermined uplink frequency. The controller 14 indicates the allocation of the uplink $RB_{N+1}$ to the first UE ($UE_1$) by transmitting an Uplink State Flag ($USF_1$) unique to $UE_1$ within downlink Radio Block $RB_N$, that is, in the Radio Block immediately prior. The normal uplink transmission of $UE_1$, assuming it takes advantage of the transmission opportunity indicated by $USF_1$, is four bursts, as depicted in FIG. 2(a).

According to embodiments of the present invention, the network controller 14 selects two UEs 16, 18 to operate in Near Companion Mode (NCM), whereby a UE 16, 18 may utilize any of its companion's unused transmission opportunities. In one embodiment, the controller 14 selects two UEs 16, 18 that each have an ongoing uplink Temporary Block Flow (TBF) that has been assigned to the same uplink radio channel (e.g., frequency and timeslot(s)), where the uplink TBFs share one or more time slots. In another embodiment, the controller 14 selects two UEs 16, 18, both of which transmit uplink signals (e.g., data packets) to the same serving network transceiver 12 at similar signal strength levels, with similar block error rate (BLER) performance. As used herein, "similar" means the relevant measurements for the two UEs 16, 18 differ by less than a predetermined threshold value. In still another embodiment, the controller 14 selects two UEs 16, 18, both of which are being managed by the controller 14 using similar time alignment parameters. In yet another embodiment, the controller 14 selects two UEs 16, 18, both of which are using the same Transmission Time Interval (TTI) for the uplink TBFs for which they share one or more common time slots operating according to either the Basic Transmission Time Interval (BTTI) or Reduced Transmission Time Interval (RTTI). In yet another embodiment, the controller 14 selects two UEs 16, 18, both of which have been assigned the same nominal transmit levels and the same modulation scheme. In yet another embodiment, the controller 14 selects two UEs 16, 18, both of which have similar Quality of Service (QoS) attributes (e.g., low transfer delay) associated with the uplink TBFs for which they share one or more common time slots.

Upon determining that it is serving two UEs 16, 18 capable of NCM, that meet any combination of the above factors, the controller 14 may then decide to have them operate in Near Companion Mode. The controller 14 is aware of whether the UEs 16, 18 are capable of NCM by the UEs 16, 18 informing the controller 14, at power-up or any time thereafter, that they support NCM operation. For example, this may occur via the MS Radio Access Capabilities information element sent from UE 16, 18 to the controller 14 (e.g., when sending a Packet Resource Request message to request the establishment of an uplink TBF). The controller 14 may, for example, direct the UEs 16, 18 to enter NCM via PACCH-based signaling after completion of the uplink TBF establishment procedure. The PACCH messages inform each UE 16, 18 that it is to operate using NCM, of the uplink timeslot(s) it has in common with its CUE, and the identity of its CUE (i.e., the Uplink State Flag, or USF). The controller 14 also informs each UE 16, 18 of the uplink Temporary Block Flow (TBF) attributes for the companion UE—for example, the USF granularity, Extended Dynamic Allocation (EDA), Dynamic Allocation (DA), and the like.

Once the configuration of NCM operation is complete, each UE 16, 18 monitors the USF assigned to its CUE, in addition to monitoring its own USF. Upon detecting a companion USF (CUSF), a UE 16, 18 monitors the corresponding uplink transmission opportunity on the shared uplink channel (i.e., some or all of the first burst of the transmission opportunity corresponding to the CUSF) to ascertain whether or not the CUE actually transmits using that transmission opportunity. To monitor the CUE transmission opportunity on the shared uplink channel, the monitoring UE (MUE) tunes its receiver to the CUE uplink transmit frequency, to determine whether the CUE has started to transmit or not. This temporary retuning of its receiver to the uplink frequency of the shared uplink channel is acceptable, as the MUE relies on the controller 14 not transmitting any downlink data packet(s) addressed to the MUE on any downlink timeslot(s) that overlaps with the uplink timeslot(s) within the uplink Radio Block (s) corresponding to the CUSF.

In one embodiment, as depicted in FIG. 2(b), the CUE for which a transmission opportunity has been allocated may transmit a predetermined pattern during the first portion of the first burst of its allocated transmission opportunity. This indicates to the MUE that the CUE will not utilize the remainder of its transmission opportunity, and that the MUE may transmit an uplink data packet using either some of the remaining portion of the first burst and some portion of the remaining 3 bursts (bursts 2, 3 and 4) or none of the remaining portion of the first burst but all of the remaining 3 bursts or even some of the remaining portion of the first burst and all of the remaining 3 bursts of the transmission opportunity granted to the CUE.

In one embodiment, as depicted in FIG. 2(c), MUE looks for the presence of energy in a predetermined portion of the first of four bursts that the CUE would normally transmit, if it makes use of its assigned transmission opportunity. The predetermined portion is preferably the duration of the first burst;

is more preferably the first half of the duration of the first burst; and is most preferably the first 20% of the duration of the first burst. The MUE can discriminate which of the four bursts is the first, as the MUE and CUE both use either Basic TTI (BTTI) or Reduced TTI (RTTI) mode on the common uplink timeslot(s) of the shared uplink channel. Since the MUE already has its receiver tuned to the uplink TX frequency, and also has its transmitter tuned to the TX frequency, there is no switching time required prior to beginning to transmit a data packet on the uplink whenever the MUE decides to use a transmission opportunity assigned to but not used by its CUE.

In either case, once the MUE determines that the CUE will not take advantage of the CUE assigned transmission opportunity, the MUE may utilize some portion of the transmission opportunity allocated to the CUE for its own uplink transmissions, referred to herein as a Stolen Transmission Opportunity (STO). There will be some reaction time required that begins when the MUE determines it can make use of a STO, and ends when the MUE begins transmitting using that STO. If too little (e.g., 25%) of the first burst remains after taking both the decision time (i.e., the time required for the MUE to determine that the CUE will not make use of a transmission opportunity allocated to the CUE) and the reaction time into account, then the MUE can decide to not use any portion of the first burst and instead send three full length bursts, utilizing the entirety of the last three bursts that the CUE would have transmitted, as depicted in FIG. 2(*c*). In this case an NCM radio block based on three modified full length bursts may be defined for use during NCM (i.e., where constructing an NCM radio block assumes only three bursts are available and involves the use of a channel coding, puncturing scheme and interleaving that is different from what is used during legacy operation where a legacy radio block is sent using four bursts). Alternatively, in this case the MUE may simply transmit an NCM radio block using three legacy bursts (i.e., where constructing an NCM radio block assumes 4 bursts are available and involves the use of legacy channel coding, puncturing, and interleaving, but only the last 3 bursts are actually transmitted) utilizing the entirety of the last three bursts that the CUE would have transmitted; the serving transceiver 12 in this latter case would handle the three bursts as if it missed the first of the four legacy bursts it would normally expect.

If the decision time and the reaction time are short enough, the MUE may transmit uplink data (e.g., a data packet) using at least part of the first burst as well. In this case, the MUE may transmit an NCM radio block based on four abbreviated bursts, referred to herein as NCM bursts, as depicted in FIG. 2(*d*). An NCM burst may be defined to carry a modified EGPRS RLC/MAC block (EGPRS or EGPRS2) that is missing at least one of the conditional RLC data blocks. For example, the NCM feature can be used when both UEs 16, 18 are operating an uplink TBF that is configured to use MCS 7 to 9, UAS 7 to 11 or UBS 7 to 12 (i.e., the cases in which there is at least one conditional RLC data block) where one of the conditional RLC data blocks normally carried within an RLC/MAC block can be dropped to form an NCM burst. For the case where the MUE uses some of the remaining portion of the first burst and all of the remaining three bursts the remaining portion of the first burst could be used to carry extra parity or signaling information while the remaining three bursts would be used to carry an NCM radio block as previously described. At the same point when the controller 14 indicates that NCM is to be used and the USF of a companion UE (CUSF), the controller 14 may also specify whether NCM UEs 16, 18 should use modified full length bursts, legacy bursts or NCM bursts for sending NCM radio blocks during STOs.

Using an STO while operating in NCM may allow for faster notification to the network that a UE operating in NCM has additional uplink payload to send (i.e., a UE needs the controller 14 to resume normal scheduling of the USF based transmission opportunities for that UE) after operating with reduced uplink transmission opportunities for some amount of time—that is, for the case where the frequency of USF based transmission opportunities for a UE 16, 18 has been reduced by the controller 14 due to a temporary period of UE 16, 18 inactivity. One example is the case where two companion UEs 16, 18 are both supporting Voice over IP (VoIP) where the peer entity associated with each UE is located in the fixed network. UE 16 is active in the uplink (the user is talking) and UE 18 is inactive (the user listening). If UE 18 is inactive long enough, the controller 14 may reduce the USF allocations for UE 18 to an amount less than that normally needed when UE 18 again becomes active (the user begins talking). If the point at which UE 18 becomes active again corresponds to a point in time where UE 16 decides not to use one of its USF-based transmission opportunities, UE 18 may use it as an STO. This not only increases the uplink capacity of the network 10, but as the UE 18 transmits a unique Temporary Flow Identifier (TFI) during an STO, it also informs the controller 14 that UE 18 has additional uplink payload to send, prompting the controller 14 to resume normal scheduling of USFs for UE 18.

Figure 3:
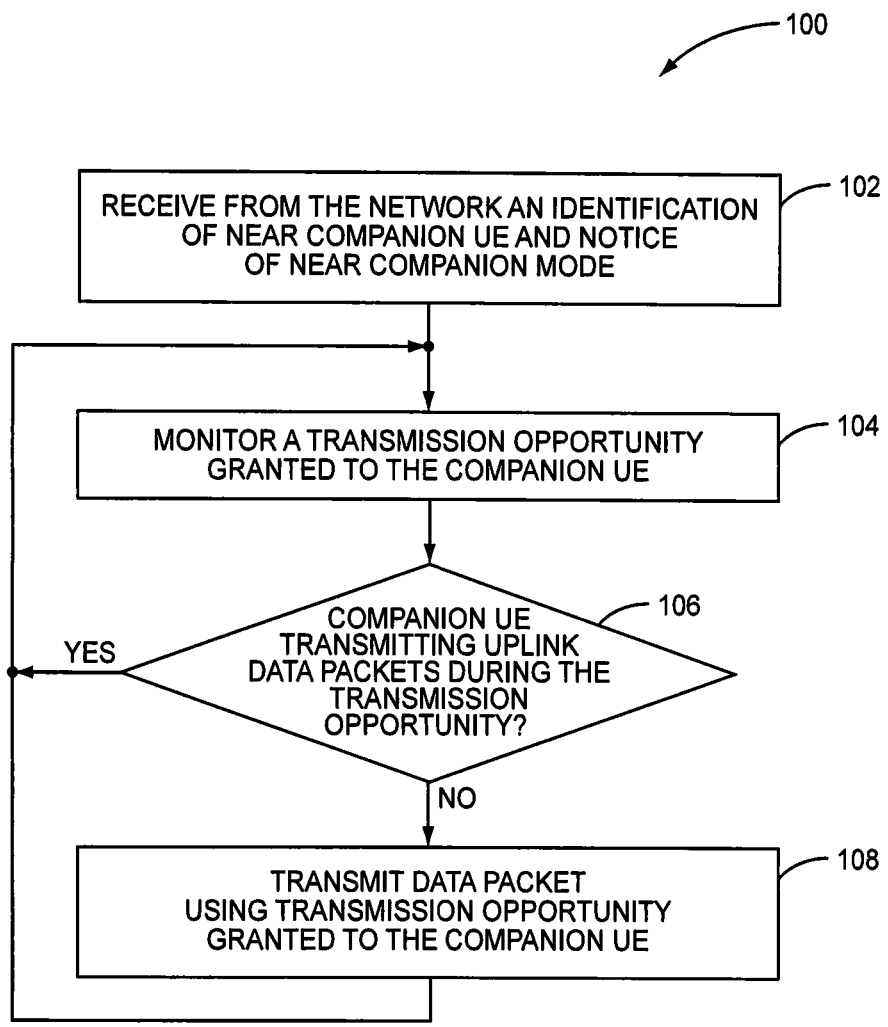
FIG. 3 is a flow diagram of a method of transmitting uplink signals by a UE.

FIG. 3 depicts a method 100 of operating a UE 16, 18 in NCM. The UE 16, 18 receives from a network controller 14 the identification (i.e., the USF) of its near companion UE 18, 16, and an indication that the UE 16, 18 is to operate in NCM (block 102). This indication may be transmitted at power-up, or any other time, via control signaling. At the same point when the controller 14 indicates that NCM is to be used and the USF of a companion UE (CUSF), it also provides the UE 16, 18 (now the MUE) with an indication of the uplink timeslot(s) it has in common with its CUE. The MUE monitors the CUSF on the downlink timeslot(s) corresponding to uplink timeslot(s) it has in common with the CUE to determine when a transmission opportunity has been granted to its CUE (block 104). The MUE determines wither its CUE utilizes the transmission opportunity corresponding to CUSF (block 106). This may comprise monitoring the allocated transmission opportunity for an uplink data packet being transmitted from the CUE. Alternatively, the CUE may transmit a known pattern within an initial (i.e., opening) portion of the first burst of the allocated transmission opportunity to indicate its availability to the MUE (i.e., the CUE indicates an STO is available). In either case, the MUE utilizes a STO by transmitting uplink signals (e.g., a data packet) on the shared uplink channel (block 108). During future transmission opportunities assigned to it, the UE 16, 18 may itself transmit a known pattern during the initial portion of the first burst corresponding to that transmission opportunity, to indicate to its CUE that the channel is not being utilized, and is available for a STO.

Figure 4:
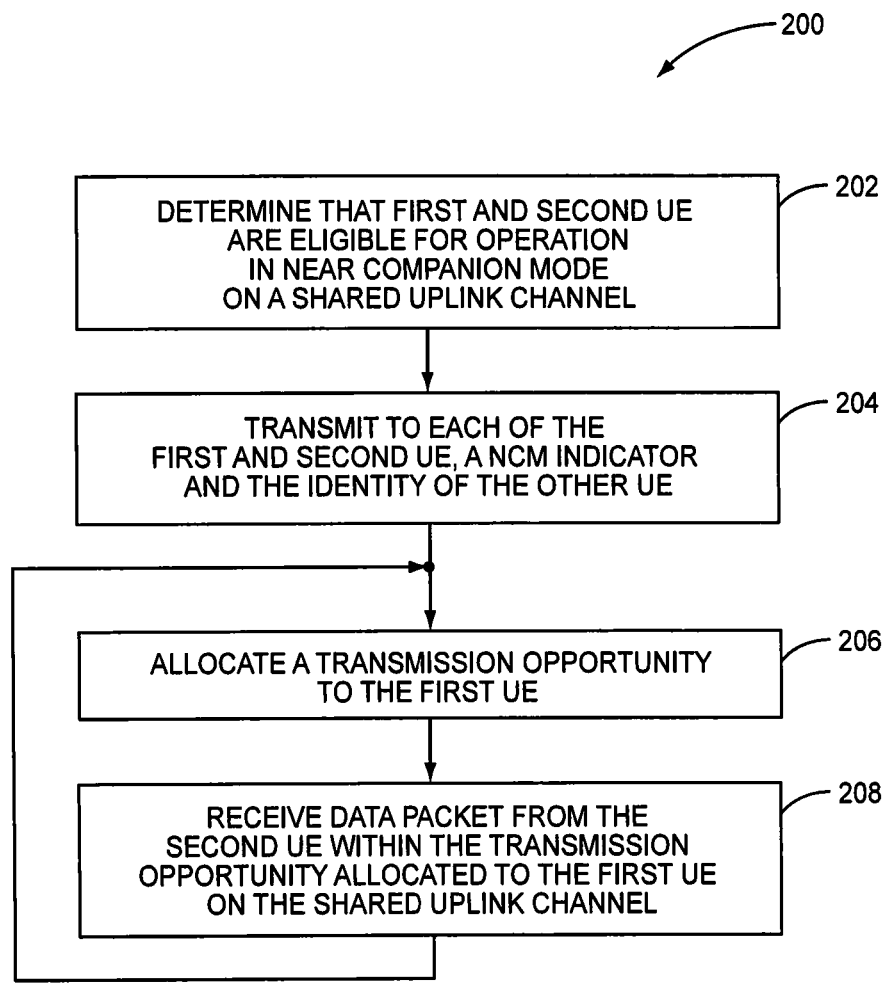
FIG. 4 is a flow diagram of a method of operating a wireless communication network controller.

FIG. 4 depicts a method 200 of operating a wireless communication network controller 14 in NCM. Based on any combination of factors, as described above, the controller 14 identifies a first and second UE 16, 18 as being eligible for operation in NCM on a given shared uplink channel (block 202). The controller provides each UE 16, 18 with an indication they are to operate in NCM, and the unique identity (i.e., a UE-specific USF) of the other UE 16, 18 (block 204). Later, the controller 14 sends a USF that allocates a transmission opportunity to a first UE 16 (block 206). The controller 14 then receives an uplink data packet transmitted by the second UE 18—the CUE to the UE 16—on the transmission opportunity allocated to the first UE 16 (block 208). The uplink NCM radio block (containing a data packet) sent by UE 18 may comprise the transmission of only three of the four bursts (the last 3 bursts) that UE 16 would normally have transmitted, or may comprise four NCM bursts, as described above.

By operating in NCM, system uplink capacity is maximized, as a MUE may take advantage of a transmission opportunity allotted to a CUE but which the CUE does not utilize. Additionally, a STO in NCM mode allows a MUE an opportunity to alert a network controller 14 that it has additional uplink data (i.e., following a period for which it had no uplink data available for transmission), and should therefore be allocated additional uplink transmission opportunities by increasing the frequency of USFs assigned to the MUE.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, by a first User Equipment (UE), of transmitting uplink data packets in a wireless communication network implementing a Near Companion Mode (NCM) in which the network pairs individual UEs as companion UEs for the purpose of potentially sharing uplink transmission opportunities between the companion UEs, the method comprising:
   receiving from the network information that both identifies a second UE and indicates that the second UE is to be considered a companion UE in NCM;
   receiving from the network an identification of an uplink channel shared with the companion UE;
   monitoring uplink transmissions by the companion UE during a transmission opportunity granted to the companion UE on the shared uplink channel;
   determining that the companion UE will not transmit an uplink data packet using the uplink transmission opportunity granted to it; and
   transmitting a data packet using the transmission opportunity granted to the companion UE.

2. The method of claim 1 wherein receiving from the network information that both identifies a second UE and indicates that the second UE is to be considered a companion UE in near companion mode comprises receiving the information via signaling on a Packet Associated Control Channel (PACCH) after completion of an uplink Temporary Block Flow (TBF) establishment procedure.

3. The method of claim 2 wherein the PACCH-based signaling includes an identification of the uplink channel frequency and one or more corresponding uplink timeslots the first UE has in common with the companion UE for the shared uplink channel.

4. The method of claim 2 wherein the PACCH-based signaling includes an identification of uplink TBF attributes for the companion UE.

5. The method of claim 2 wherein the PACCH-based signaling includes an indication of whether NCM radio blocks are to be constructed, when NCM is being used, using one of:
   modified full length bursts with new channel coding, puncturing, and interleaving;
   legacy bursts with legacy channel coding, puncturing, and interleaving; or
   NCM bursts.

6. The method of claim 1 wherein receiving from the network information that both identifies a second UE and indicates that the second UE is to be considered a companion UE in near companion mode comprises receiving the information via an assignment message sent to the first UE during uplink Temporary Block Flow (TBF) establishment procedure.

7. The method of claim 6 wherein the assignment message includes an identification of the uplink channel frequency and one or more corresponding uplink timeslots the first UE has in common with the companion UE for the shared uplink channel.

8. The method of claim 6 wherein the assignment message includes an identification of uplink TBF attributes for the companion UE.

9. The method of claim 6 wherein the assignment message includes an indication of whether NCM radio blocks are to be constructed, when NCM is being used, using one of:
   modified full length bursts with new channel coding, puncturing, and interleaving;
   legacy bursts with legacy channel coding, puncturing, and interleaving; or
   NCM bursts.

10. The method of claim 1 wherein monitoring a transmission opportunity granted to the companion UE comprises tuning the receiver of the monitoring UE to the uplink transmit frequency of the shared channel, and monitoring the transmission opportunity granted to the companion UE.

11. The method of claim 1 wherein determining that the companion UE will not transmit an uplink data packet using the uplink transmission opportunity granted to it comprises determining that the second UE has not transmitted using the uplink transmission opportunity within a predetermined duration.

12. The method of claim 11 wherein the predetermined duration is the entire first of four uplink bursts corresponding to an uplink transmission opportunity.

13. The method of claim 11 wherein the predetermined duration is a predetermined portion of the first of four uplink bursts corresponding to an uplink transmission opportunity.

14. The method of claim 11 wherein the predetermined duration is 20% of the first of four uplink bursts corresponding to a given uplink transmission opportunity.

15. The method of claim 1 wherein determining that the companion UE will not transmit an uplink data packet using the uplink transmission opportunity granted to it comprises detecting a predetermined data pattern transmitted by the companion UE within the first of four uplink bursts corresponding to an uplink transmission opportunity.

16. The method of claim 1 wherein transmitting a data packet using the uplink transmission opportunity granted to the companion UE but used by the monitoring UE comprises transmitting an NCM radio block consisting of one of three modified full length bursts, three legacy bursts, or four NCM bursts, on the shared uplink channel.

17. The method of claim 1 further comprising:
   receiving from the network an Uplink State Flag (USF) identifying an uplink transmission opportunity; and
   transmitting a predetermined data pattern, in lieu of an uplink data packet, using the uplink transmission opportunity, to indicate that a companion UE may utilize the remainder of the transmission opportunity.

18. A method, by a controller associated with one or more fixed network transceivers, of receiving uplink data packets in a wireless communication network implementing a Near Companion Mode (NCM) in which the network pairs individual UEs as companion UEs for the purpose of potentially sharing uplink transmission opportunities between the companion UEs, the method comprising:
  determining that first and second User Equipment (UE) served by the controller are eligible for operation in NCM;
  transmitting to each of the first and second UE a UE-specific Uplink State Flag (USF) that both indicates the respective UE should operate in NCM, and identifies the other UE as a NCM companion UE;
  granting to the first UE an uplink transmission opportunity; and
  receiving a data packet from the second UE using the uplink transmission opportunity granted to the first UE.

19. The method of claim 18 wherein determining that first and second User Equipment (UE) served by the controller are eligible for operation in near companion mode comprises determining that uplink data packets from the first and second UE are received at signal strength levels that differ by less than a first predetermined threshold, and with block error rate (BLER) performance that differs by less than a second predetermined threshold.

20. The method of claim 18 wherein determining that first and second User Equipment (UE) served by the controller are eligible for operation in near companion mode comprises determining that the first and second UE are being managed using similar time alignment parameters.

21. The method of claim 18 wherein determining that first and second User Equipment (UE) served by the controller are eligible for operation in near companion mode comprises determining that the first and second UE have been assigned the same nominal transmit levels and the same modulation scheme.

22. The method of claim 18 wherein the controller operates according to a GPRS-based protocol and wherein the first and second UE are assigned an uplink Temporary Block Flow (TBF) on the same channel frequency.

23. The method of claim 22 wherein determining that first and second User Equipment (UE) served by the controller are eligible for operation in near companion mode comprises determining that the first and second UE are assigned the same uplink frequency and that the uplink TBFs of the first and second UE share one or more timeslots.

24. The method of claim 22 wherein determining that first and second User Equipment (UE) served by the controller are eligible for operation in near companion mode comprises determining that the first and second UE use the same Transmission Time Interval (TTI) for uplink TBFs for which they share one or more timeslots.

25. The method of claim 22 wherein determining that first and second User Equipment (UE) served by the controller are eligible for operation in near companion mode comprises determining that the first and second UE have the same Quality of Service (QoS) attributes associated with the uplink TBFs for which they share one or more timeslots.

26. The method of claim 18 wherein transmitting to each of the first and second UE a UE-specific USF that both indicates the respective UE should operate in NCM, and identifies the other UE as a NCM companion UE comprises transmitting the UE-specific USF via PACCH-based signaling after completion of an uplink TBF establishment procedure.

27. The method of claim 18 wherein transmitting to each of the first and second UE a UE-specific USF that both indicates the respective UE should operate in NCM, and identifies the other UE as a NCM companion UE comprises transmitting the UE-specific USF via an assignment message sent to the UE during uplink Temporary Block Flow (TBF) establishment procedure.

28. The method of claim 18 wherein granting to the first UE an uplink transmission opportunity comprises transmitting to the first UE a USF unique to that UE identifying an uplink transmission opportunity.

29. The method of claim 28 wherein the USF is transmitted to the first UE over a shared downlink channel monitored by the second UE.

30. The method of claim 18 wherein receiving a data packet from the second UE using the transmission opportunity granted to the first UE further comprises subsequently scheduling the second UE for increased USF based uplink transmission opportunities.

* * * * *